United States Patent [19]
Sullivan et al.

[11] Patent Number: 5,832,277
[45] Date of Patent: Nov. 3, 1998

[54] SYSTEM FOR ARBITRATING DEMAND ON MEMORY DURING CONFIGURATION OF A COMPUTER ADD-ON CARD

[75] Inventors: Ronald J. Sullivan, Elgin; Brett W. Chaveriat, Arlington Heights; Robert C. Suffern, Chicago, all of Ill.; Khodor S. Elnashar, Dallas, Tex.

[73] Assignee: 3 Com Corporation, Skokie, Ill.

[21] Appl. No.: 613,084

[22] Filed: Mar. 8, 1996

[51] Int. Cl.⁶ ...................................................... G06F 13/00
[52] U.S. Cl. ............................................ 395/729; 711/150
[58] Field of Search ........................... 361/686; 375/222; 395/287–288, 299, 474, 477–479, 856, 868, 870, 726, 728–729, 733, 741–742; 711/150

[56] References Cited

U.S. PATENT DOCUMENTS

| | | | |
|---|---|---|---|
| 4,263,670 | 4/1981 | Sherman ................................... | 375/223 |
| 4,549,273 | 10/1985 | Tin ........................................... | 395/477 |
| 4,809,269 | 2/1989 | Gulick ...................................... | 370/462 |
| 5,467,461 | 11/1995 | Nasu et al. ............................... | 395/474 |
| 5,532,898 | 7/1996 | Price ........................................ | 361/119 |
| 5,581,720 | 12/1996 | Kaba ........................................ | 395/567 |
| 5,608,324 | 3/1997 | Yoshida ................................... | 324/426 |
| 5,608,607 | 3/1997 | Dittmer ................................... | 361/686 |
| 5,617,291 | 4/1997 | Fujii et al. ............................... | 361/686 |

*Primary Examiner*—Lance Leonard Barry
*Attorney, Agent, or Firm*—McDonnell Boehnen Hulbert & Berghoff

[57] ABSTRACT

A processor on an add-on card that arbitrates demand on a memory unit on the add-on card. The processor and memory unit are used for the underlying functionality of the add-on card. The processor determines an appropriate time to allow interface operations to the memory unit when the memory unit is not already being accessed for the underlying functionality of the card. By using the processor and memory unit on the add-on card for interface operations to the host computer, the add-on interface circuitry on the add-on card can be minimized and simplified.

19 Claims, 3 Drawing Sheets

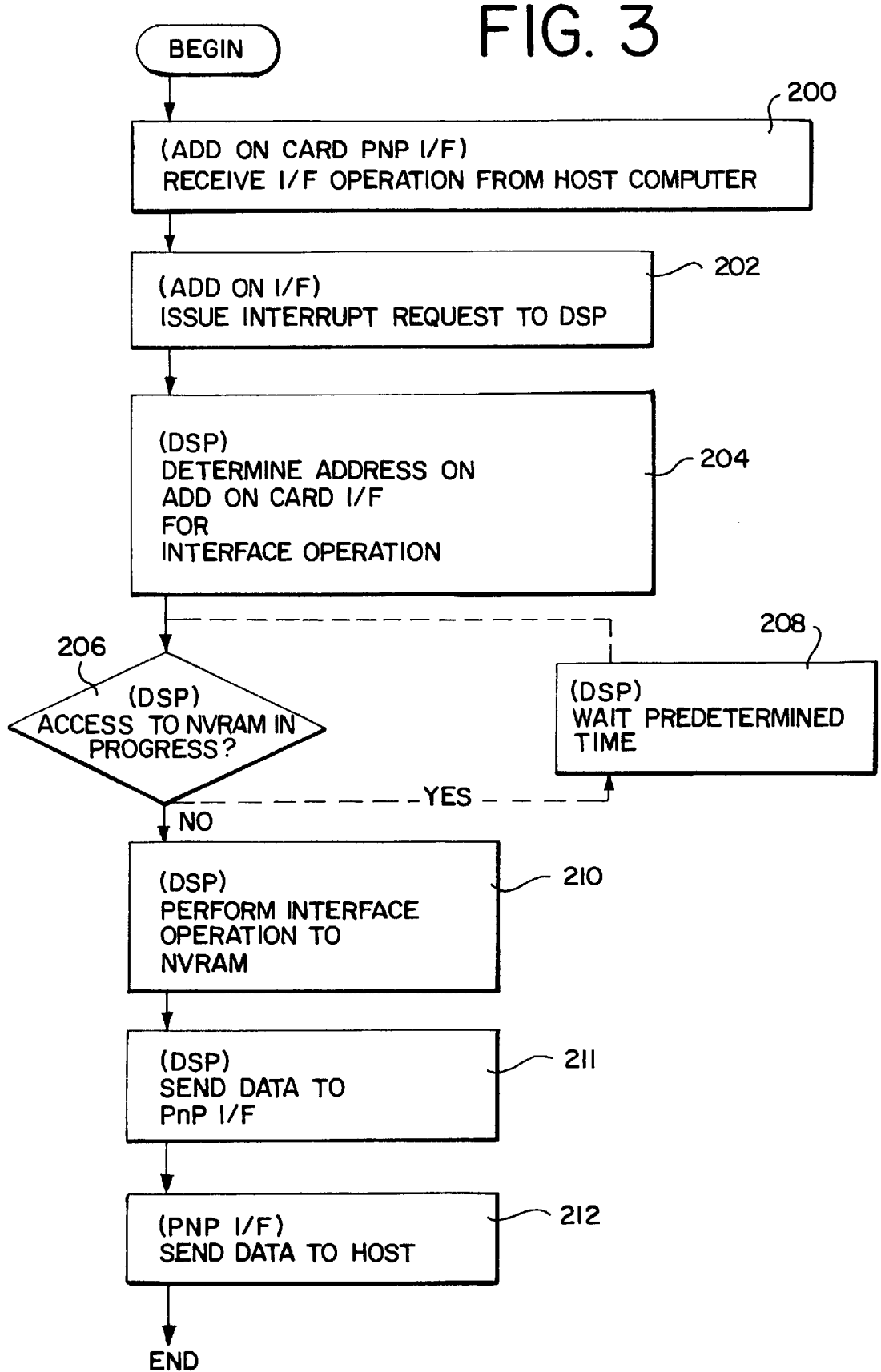

SYSTEM FOR ARBITRATING DEMAND ON MEMORY DURING CONFIGURATION OF A COMPUTER ADD-ON CARD

FIELD OF THE INVENTION

The present invention relates generally to computer systems, and more particularly to method and apparatus for use during configuration of computer add-on cards.

BACKGROUND OF THE INVENTION

An add-on card may be installed on a computer system to expand functional capabilities of the computer system. The host computer configures such an add-on card in order to assign available system resources that the add-on card may require. Configuration of an add-on card ensures that the add-on card operates harmoniously within the computer system.

The accepted industry standard protocol for automatically configuring add-on cards for Industry Standard Architecture (ISA) based host computers is the Plug and Play (PnP) protocol which is specified by the Plug and Play ISA Specification, (c) Copyright 1993, 1994 by Intel Corporation and Microsoft Corporation and further described in *Plug and Play System Architecture,* Tom Shanley, published by Mindshare, Inc., 1995. In the case where multiple add-on cards are installed in the computer system, the PnP protocol interrogates each card to determine the card's vendor, identification information, and the system resources the card may require in order to carry out the underlying functionality of the add-on card. Upon such interrogation, each card is assigned respective system resources such that the cards will not conflict with each other during performance of their underlying functionality.

Each add-on card has an add-on interface that responds to host computer demands during such configuration of the add-on cards. This add-on card/host computer interface typically has memory to retain the add-on card's resource request information and available configuration options that the PnP protocol requires such as the card's vendor and identification information. Also, this memory may be used to store additional data regarding system resources that the host computer may assign to that add-on card.

The add-on card may require additional memory to perform its underlying functionality. An add-on card of the prior art may use a first memory for the interface data and a separate second memory for the underlying functionality data of the add-on card.

In the case where one of the first or second memory has enough space to store both interface data and functionality data, having two memories is unnecessary. In such a case, circuitry on the add-on card can be minimized and simplified by using a single memory for both the interface data and for the functionality data. However, with the sharing of a single memory, the demand on this memory may need arbitration.

OBJECTS OF THE INVENTION

Accordingly, a primary object of the present invention is to minimize and simplify the circuitry of an add-on card by arbitrating demand on a single memory by use of a processor device already existent for the underlying functionality of the add-on card.

In particular, an object of the present invention is to have such a processor operate on the single memory as requested by the add-on interface even when this request occurs while the processor and the single memory are in use for the underlying functionality of the add-on card. The processor operates on the single memory at an appropriate time when the single memory is not already being accessed for the underlying functionality of the add-on card.

SUMMARY OF THE INVENTION

In one aspect of the present invention, a processor of an add-on card is notified of an interface operation to memory on the add-on card upon receipt of a request from an add-on card/host computer interface on the add-on card. The processor then arbitrates demands on such memory between the interface operation and the underlying functionality of the add-on card.

In another aspect of the present invention, the processor of the add-on card also performs the underlying functionality of the add-on card. Such a processor determines the appropriate time for the interface operation to the add-on memory when the add-on memory is not already being accessed for the underlying functionality of the add-on card.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

FIG. 3 shows a flowchart of the interface operation to a SNVRAM of the add-on card of FIG. 1, according to a preferred embodiment of the present invention.

DETAILED DESCRIPTION OF THE PREFERRED EMBODIMENT

Figure 1:
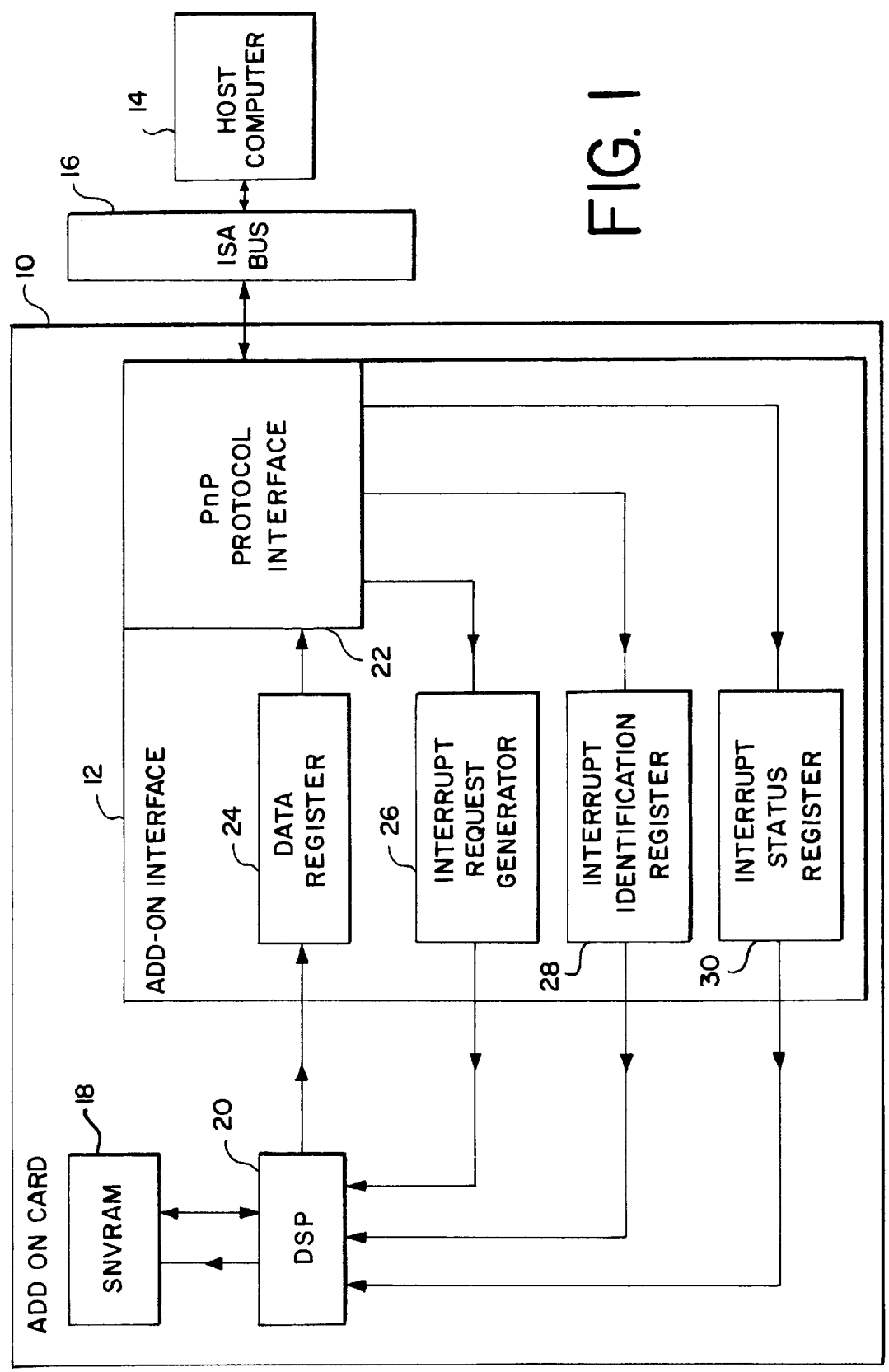
FIG. 1 shows an add-on card according to a preferred embodiment of the present invention.

FIG. 1 shows an add-on card 10 according to a preferred embodiment of the present invention. This add-on card includes an add-on interface 12 to provide configuration communication between the add-on card and a host computer 14 via an Industry Standard Architecture (ISA) bus 16. In a preferred embodiment, the add-on card 10 is a modem add-on card.

The add-on card also includes a Serial Non-Volatile RAM (SNVRAM) 18 for storing data used in functionality of the add-on card. Such a SNVRAM is available from SGS-Thomson Microelectronics Inc., as part number ST93C56. A Digital Signal Processor (DSP) 20 is also used in the add-on card functionality. Such a DSP is available from Texas Instruments Inc., as part number TMS 320C52.

The add-on interface 12 includes a Plug and Play (PnP) interface 22 which communicates with the host computer according to the PnP protocol. An exemplary implementation for the PnP protocol is available in VHDL-code to the public from Intel Corp. Information Technology Information Organization, Sacramento Calif. 95821. An exemplary implementation for the PnP protocol is available also in Verilog®-code from Texas Instruments, Inc., Dallas, Tex. 75243. The add-on interface 12 also includes a data register 24, an interrupt request generator 26, an interrupt identification register 28, and an interrupt status register 30, all of which are operatively connected between the DSP 20 and PnP protocol interface.

An add-on interface of a prior art add-on card would also include its own non-volatile data storage unit to store interface data related to configuration of the add-on card. In the add-on card of the preferred embodiment of the present invention, the SNVRAM 18 that is used for the add-on card functionality is also used to store such interface data. Thus, the circuitry of the add-on card is simplified and minimized since a memory unit is eliminated without significant additional circuit elements.

Because the SNVRAM 18 stores both interface data and add-on card functionality data, contention for operation to the SNVRAM can arise when interface operations and add-on card functionality operations are simultaneously demanded on the SNVRAM. The DSP 20 would make the demand for add-on card functionality, and the add-on interface 12 would make the demand for interface operation.

As in a typical add-on card, the DSP 20 would have a faster response time than the add-on interface 12 and the SNVRAM 18. In addition, the DSP can perform control functions. Thus, the DSP can arbitrate the demand on the SNVRAM for interface data by the add-on interface and for add-on card functionality data by the DSP itself.

Figure 2:
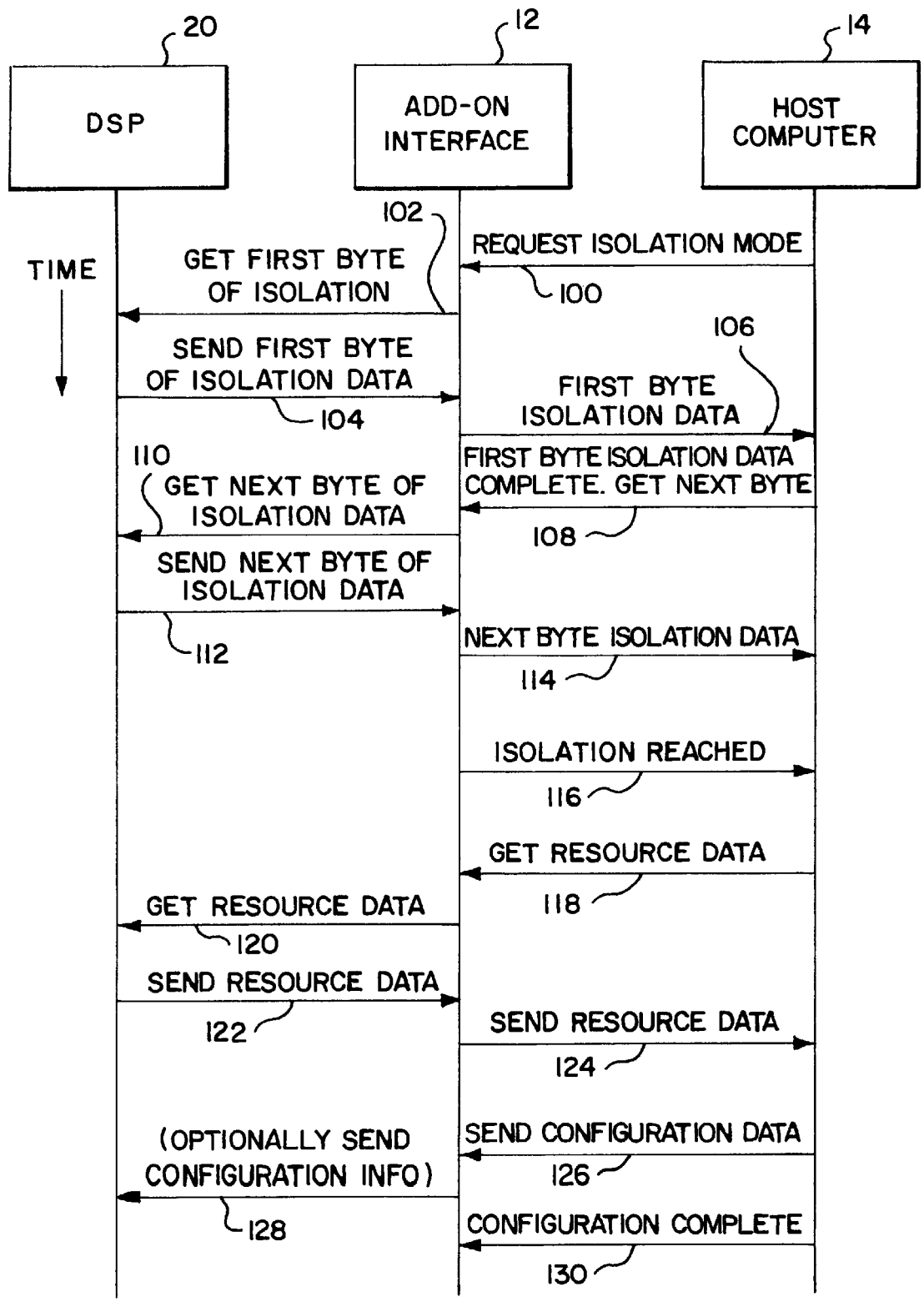
FIG. 2 shows a time line of interaction between a DSP, an add-on interface, and a host computer of the add-on card of FIG. 1, during a Plug and Play protocol.

Before arbitration by the DSP is described, the add-on card configuration operation for the add-on card according to the PnP protocol is now described in more detail to illustrate the interface operations demanded on the SNVRAM 18. FIG. 2 shows a time line of interactions between the DSP 20, add-on interface 12, and host computer 14 of the add-on card.

Referring to FIG. 2, the host computer sends a request for starting a Plug and Play isolation sequence for all add-on cards installed in the computer system, to the add-on interface 12 at time step labeled 100. As specified in the Plug and Play ISA Specification, the isolation mode during the PnP protocol allows each add-on card in a computer system to be systematically selected for configuration by the host computer.

During isolation mode, each card is effectively assigned a place in a priority list of add-on cards to be configured by the host computer. The respective place in such a priority list for any add-on card is determined by isolation data which is part of the interface data.

In the add-on card 10 of FIG. 1, this interface data is stored in the SNVRAM 18, and is obtained through the DSP 20 which is acting as an intermediary to the SNVRAM. Thus, referring to FIG. 2, the add-on interface 12 requests the DSP to get the first byte of isolation data at time step labeled 102. The DSP after arbitration (which will be described in more detail in the specification herein) for such data from the SNVRAM sends the requested first byte of isolation data to the add-on interface at time step labeled 104.

The add-on interface puts this first byte of isolation data on the ISA bus 16 of the host computer 14 for the first pass isolation mode at time step labeled 106. Meanwhile, any other add-on cards in the computer system are also putting respective first item isolation data on the ISA bus. Depending on such first byte isolation data for each add-on card, one of the add-on cards will be configured during this first pass isolation.

If the add-on card 10 were to be chosen for the configuration during this first pass isolation, then isolation would be reached. Such subsequent isolation data would be retrieved from the SNVRAM and put on the ISA bus for isolation until the card reached isolation. At finally reaching isolation, resource data and configuration data would be exchanged as shown in time steps labeled 118–130 and as described for the case of isolation at the first pass isolation. When isolation is reached for this add-on card at time step labeled 116, the host computer 14 directs the add-on interface 12 to get resource data at time step labeled 118.

The add-on interface 12 requests the resource data for this add-on card from the DSP 20 at time step labeled 120. This resource data is also stored in the SNVRAM 18 in the add-on card 10 of FIG. 1. The DSP after arbitration for such resource data at the SNVRAM sends the requested resource data to the add-on interface 12 at time step labeled 122. The add-on interface then sends this resource data to the host computer 14 at time step labeled 124. This resource data informs the host computer of the capabilities of the add-on card and of the system resources required by the add-on card to carry out add-on card functionalities.

After receipt of resource data, the host computer 14 sends configuration data to the add-on interface 12 at time step labeled 126. This configuration data assigns respective system resources to this add-on card. This configuration data may optionally be stored in the SNVRAM 18 of the add-on card. In that case, this configuration data would be sent to the DSP 20 at time step labeled 128. The DSP 20 after arbitration would write this configuration data into the SNVRAM.

Once configuration data for this add-on card is received, a configuration complete signal is sent from the host computer to the add-on interface at time step labeled 130. The host computer then may go through additional isolation modes to configure additional add-on cards.

If the add-on card were not chosen for configuration at the first pass isolation, then this card would not continue retrieving subsequent bytes of isolation data from the SNVRAM through arbitration by the DSP as shown in time steps labeled 108, 110 until the next isolation pass, as shown in time steps 112, 114.

The PnP protocol requires interface data such as isolation data and resource data to be read from the SNVRAM, or such as configuration data to be written into the SNVRAM. Such read or write interface operations on the SNVRAM may be in contention with add-on card functionality operations on the SNVRAM.

The DSP arbitrates between these operation demands on the SNVRAM and carries them out as shown in the flowchart of FIG. 3. Referring also to FIG. 1, the PnP protocol interface 22 receives an interface operation request from the host computer 14 (step 200). This interface operation request may be a request for isolation data or resource data, or a sending of configuration data to the PnP protocol interface.

After the PnP protocol interface 22 receives an interface operation request (step 200), the PnP protocol interface signals the interrupt request generator 26 to send an interrupt request to the DSP 20 (step 202). The PnP protocol interface also sets the interrupt identification register 28 and the interrupt status register 30.

Upon receipt of the interrupt request from the interrupt request generator 28, the DSP 20 recognizes an interface operation request from the information in the interrupt identification register 28. The DSP also accesses a prespecified address in the SNVRAM related to the interface operation from information in the interrupt status register 30 (step 204).

The DSP then determines whether the SNVRAM 18 is already being accessed for the add-on card functionality (step 206). If the SNVRAM is already being accessed, then the DSP waits a predetermined time and re-checks for access to the SNVRAM (step 208). When the SNVRAM is finally available, the interface operation (i.e. a read or write of interface data to the SNVRAM) is performed (step 210).

The host computer may be provided with requested data such as isolation data or resource data through the PnP protocol (steps 211–212). This data would have been stored upon retrieval from the SNVRAM into the data register 24 in the add-on interface 12 by the DSP 20 and subsequent retrieval by the PnP Protocol Interface.

In this manner, the DSP effectively allows interface operation to the SNVRAM at an appropriate time of minimal effect on the underlying add-on card functionality of the add-on card. With this sharing of the SNVRAM by the PnP protocol interface and the DSP, circuitry of the add-on card can be minimized and simplified by eliminating the need for a separate data storage unit for the PnP protocol interface. Moreover, the DSP used for arbitrating the demand on the single data storage unit was already existent for the underlying functionality of the add-on card. These situations can lead to lower cost of add-on cards.

The advantages of the invention can be generalized however to any add-on card that already has a memory and a processor for the underlying functionality of the add-on card. Also, the interface unit on the add-on card of the present invention can be implemented according to interface protocols aside from the Plug and Play standard. Moreover, any non-volatile fixed memory such as a ROM can be used to store fixed interface data that would be the same for multiple cards from the same manufacturer, and any non-volatile programmable memory device such as DIP switches can be used to store variable interface data that would differ for each card. Accordingly, the forgoing description is by way of example only and is not intended to be limiting. The invention is limited only as defined in the following claims and equivalents thereof.

We claim:

1. An add-on card comprising, in combination:
   an add-on interface for providing communication between said add-on card and a host computer upon an interface request for an interface operation by said host computer;
   a single add-on means for storing interface data related to said interface operation, and for storing functionality data used for an add-on functionality; and
   an add-on processor, operatively connected to said add-on interface and said means for storing, for arbitrating demand on said means for storing between said interface operation and said add-on functionality, and for providing said add-on card functionality to a computer system of said host computer.

2. The add-on card of claim 1 wherein, said add-on processor is used for said add-on functionality.

3. The add-on card of claim 1 wherein, said add-on functionality is modem functionality, said means for storing is a Non-Volatile RAM, and said add-on processor is a Digital Signal Processor.

4. The add-on card of claim 1, said means for storing including, in combination:
   a ROM for storing fixed interface data of said interface data; and
   means for storing variable interface data of said interface data.

5. The add-on card of claim 1 wherein, said add-on interface is implemented in accordance with a Plug and Play protocol.

6. An add-on card that provides add-on functionality to a computer system of a host computer, said add-on card comprising, in combination:
   an add-on interface for providing communication between said add-on card and said host computer upon an interface request for an interface operation by said host computer;
   means for storing interface data related to said interface operation, and functionality data used for said add-on functionality;
   an add-on processor, operatively connected to said add-on interface and said means for storing, for arbitrating demand on said means for storing between said interface operation and said add-on functionality;
   an industry standard architecture (ISA) interface for detecting said interface request from said host computer for said interface operation to said add-on data storage;
   an interrupt request generator for generating an interrupt request to send to said add-on processor upon detection of said interface request;
   an interrupt identification and status register for storing information regarding said interface operation that is determined by a prespecified address in said means for storing, for said interface operation; and
   an interface data register for storing said interface data related to said interface operation.

7. The add-on card of claim 6 wherein, said add-on processor is used for said add-on functionality.

8. A modem add-on card that provides modem functionality to a computer system of a host computer, said modem add-on card comprising, in combination:
   an add-on interface for providing communication between said modem add-on card and said host computer upon an interface request for an interface operation by said host computer, said add-on interface including, in combination:
   a Plug and Play protocol interface for detecting said interface request;
   an interrupt request generator for generating an interrupt request;
   an interrupt identification and status register for storing information regarding said interface operation; and
   an interface data register for storing interface data related to said interface operation;
   a Non-Volatile RAM for storing said interface data, and for storing functionality data used for said modem functionality; and
   a Digital Signal Processor, operatively connected to said add-on interface and said Non-Volatile RAM, for arbitrating demand on said Non-Volatile RAM between said interface operation and said modem functionality, and for use in said modem functionality.

9. A method for arbitrating demand on a single add-on memory, within an add-on card that provides add-on functionality to a computer system of a host computer, between an interface operation and said add-on functionality, the method including in combination, the steps of:
   receiving an interrupt request for said interface operation to said add-on memory;
   determining if said add-on memory is being accessed for said add-on functionality;
   if said add-on memory is not being accessed for said add-on functionality, performing said interface operation to said add-on memory;
   if said add-on memory is being accessed for said add-on functionality, waiting for a predetermined time and repeating previously recited steps;
   sending said interrupt request to an add-on processor that is used for said add-on functionality; and performing previously recited steps at said add-on processor.

10. The method of claim 9 wherein said add-on card is a modem add-on card, said add-on functionality is modem functionality, said add-on processor is a Digital Signal Processor, and said interface operation is a Plug and Play protocol.

11. The method of claim 9, further including in combination, the steps of:

receiving an interface request from said host computer; and performing previously recited sending and performing steps upon receiving said interface request.

12. The method of claim 10, further including in combination, the steps of:

I. receiving interrupt identification and status information;

J. determining a prespecified address in said add-on memory for said interface operation from said interrupt identification and status information; and wherein, in step C, said interface operation is performed to said prespecified address.

13. The method of claim 9, further including in combination, the step of:

K. storing interface data related to said interface operation in an interface data register.

14. The method of claim 13, wherein step C includes in combination, the steps of:

O. reading said interface data from said interface data register; and

P. writing said interface data into said add-on memory.

15. The method of claim 13, wherein step C includes in combination, the steps of:

L. reading said interface data from said add-on memory; and

M. writing said interface data into said interface data register.

16. An add-on card that provides add-on functionality to a computer system of a host computer, said add-on card comprising, in combination:

means for interfacing between said add-on card and said host computer upon an interface request for an interface operation by said host computer;

a single add-on means for storing interface data related to said interface operation, and for storing functionality data used for said add-on functionality; and means for arbitrating demand on said means for storing between said interface operation and said add-on functionality, wherein said means for arbitrating is means for performing said add-on functionality.

17. The add-on card of claim 16 wherein, said add-on functionality is modem functionality, said means for arbitrating is at a Digital Signal Processor, and said means for interfacing is in accordance with a Plug and Play protocol.

18. An add-on card comprising, in combination:

an add-on interface providing communication between said add-on card and a host computer upon an interface request for an interface operation by said host computer;

a memory device for storing interface data related to said interface operation, and for storing functionality data used for an add-on functionality; and an add-on processor, operatively connected to said add-on interface and said memory device, for arbitrating demand on said memory device between said interface operation and said add-on functionality, and for providing said add-on functionality to a computer system of said host computer.

19. An add-on card that provides add-on functionality to a computer system of a host computer, said add-on card comprising, in combination:

an add-on interface for providing communication between said add-on card and said host computer upon an interface request for an interface operation by said host computer;

a single memory device for storing interface data related to said interface operation, functionality data used for said add-on functionality, and configuration data for assigning system resources to said add-on card;

an add-on processor, operatively connected to said add-on interface and said storage device, for arbitrating demand on said storage device between said interface operation and said add-on functionality and writing said configuration data into said storage device;

an industry standard architecture (ISA) interface for detecting said interface request from said host computer for said interface operation to said add-on data storage;

an interrupt request generator for generating an interrupt request to send to said add-on processor upon detection of said interface request;

an interrupt identification and status register for storing information regarding said interface operation that is determined by a prespecified address in said storage device, for said interface operation; and an interface data register for storing said interface data related to said interface operation.

* * * * *